Jan. 8, 1952
C. GOLUMBIC ET AL
2,581,406
SEPARATION OF INDIVIDUAL PHENOLS FROM A MIXTURE
OF ISOMERIC, HOMOLOGOUS, OR OTHER
CLOSELY RELATED PHENOLS
Filed May 4, 1949
3 Sheets-Sheet 1
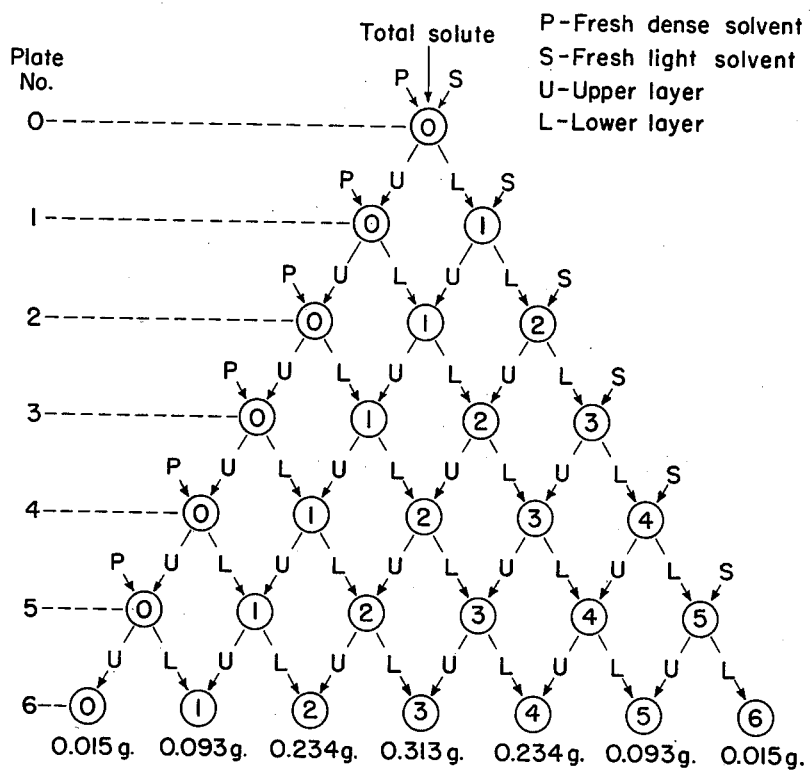
Figure I.- Scheme of counter-current distribution of 1.0 grams of material with a partition coefficient of unity, i.e. 1.
INVENTORS
Calvin Golumbic
Milton Orchin
BY
ATTORNEYS

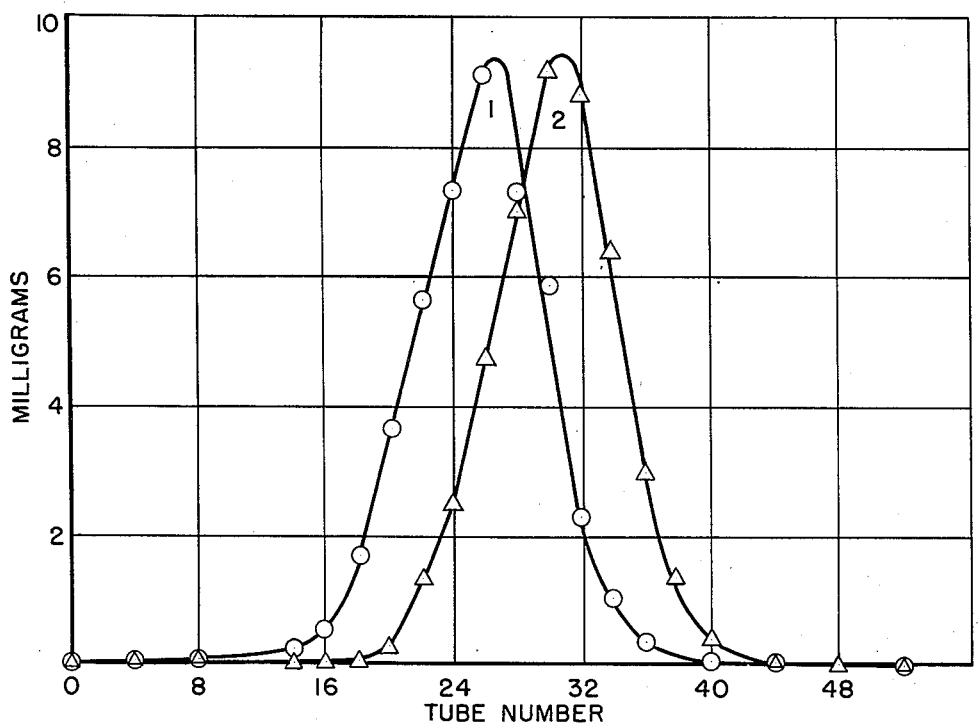
Figure 2.— Separation of cresols by 53 plate distribution.
○ — curve 1, m-cresol    △ — curve 2, p-cresol

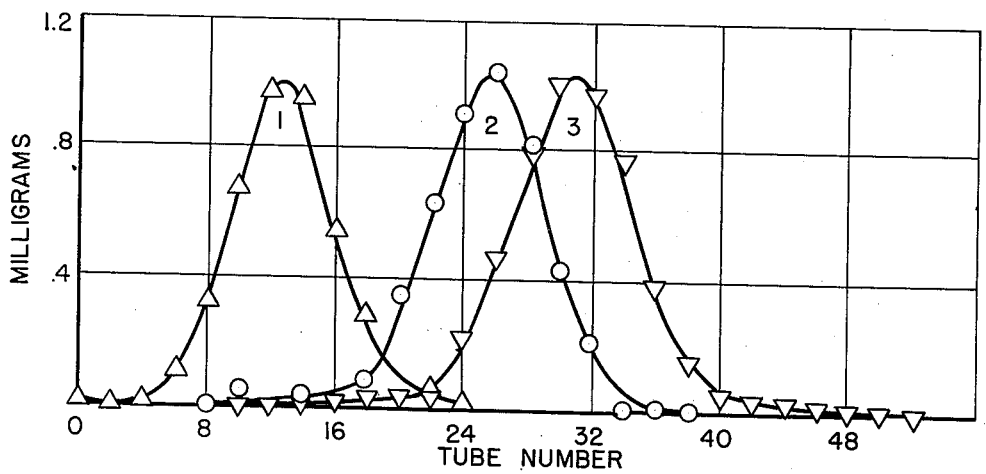
Figure 3.— Separation of xylenols by 53 plate distribution.
△ curve 1, 3,5-xylenol   ○ curve 2, 2,5-xylenol
▽ curve 3, 2,4-xylenol
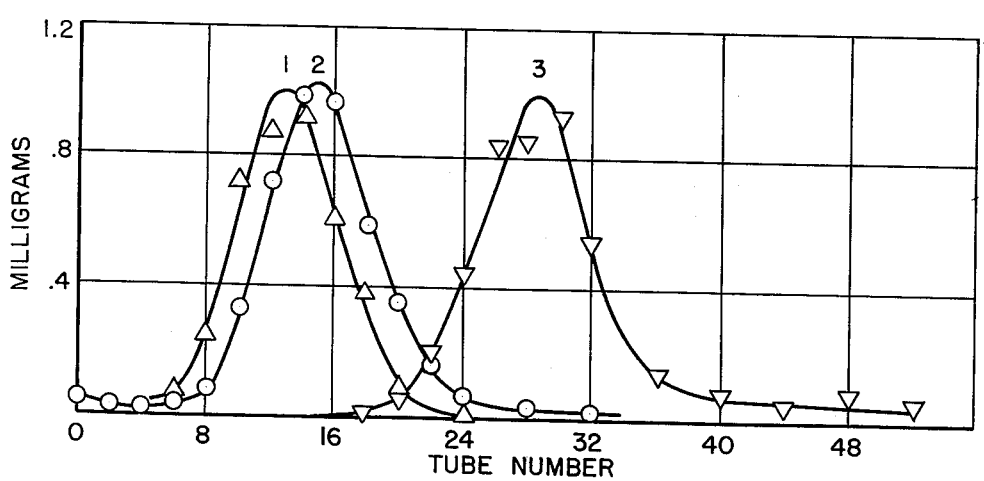
Figure 4.— Separation of ethylphenols by 53 plate distribution.
△ curve 1, m-ethylphenol   ○ curve 2, p-ethylphenol
▽ curve 3, o-ethylphenol

UNITED STATES PATENT OFFICE 2,581,406

SEPARATION OF INDIVIDUAL PHENOLS FROM A MIXTURE OF ISOMERIC, HOMOLOGOUS, OR OTHER CLOSELY RELATED PHENOLS

Calvin Golumbic and Milton Orchin, Pittsburgh, Pa., assignors to the United States of America as represented by the Secretary of the Interior Application May 4, 1949, Serial No. 91,382

9 Claims. (Cl. 260—627)

(Granted under the act of March 3, 1883, as amended April 30, 1928; 370 O. G. 757)

The invention herein described and claimed may be manufactured and used by or for the Government of the United States of America for governmental purposes without the payment of any royalties thereon or therefor.

This invention relates to the separation of individual phenols from a mixture of isomeric phenols or homologous phenols, or other closely related phenols. It is particularly advantageous in the separation of the individual components in a mixture of isomeric phenols and which is sometimes impossible because of similarity in physical properties among components of the tar acid fraction. Thus, meta- and para-cresol cannot be feasibly separated by fractional distillation because they boil within a degree of each other. Meta- and para-ethyl phenol are also difficult to separate. Likewise 2,4-xylenol, 2,5-xylenol, and 3,5-xylenol form a mixture which is very difficult to separate, inasmuch as the 2,4 and 2,5 isomers have identical boiling points and the 3,5 isomeric boils only a few degrees higher.

Recently an article has been published (B. Warshowsky and E. J. Schantz, Anal. Chem. 20, 951 of 1948) which shows that phenol and m-cresol can be partly separated by a 24-transfer distribution in a system of two immiscible solvents, the heavier of which was an acidic buffer. Their solute mixture investigated was a mixture of homologous phenols which is much easier to separate than a mixture of isomeric phenols, such as those discussed in the preceding paragraph. Even though in that system of a solvent pair those phenols give specific partition coefficients in that each appears to offer a difference from the other, although structurally different only by a $CH_3$ group, nevertheless a more effective method to isolate the pure components, particularly those of the isomeric phenols, is needed.

The foregoing disadvantages are overcome by our invention wherein the separation of isomeric phenols or homologous phenols is achieved by a method of counter-current distribution employing a solvent system of an immiscible organic liquid and an aqueous alkaline buffer. Such mixtures of isomeric phenols as cresols, xylenols, and ethyl phenols which are difficult to separate by other methods can be separated into individual components by our invention taking due care in the selection of the organic solvent and the pH range of the aqueous alkaline buffer. And if separation into each of the pure phenol isomers or homologs is not achieved the percentage of the pure isomers or homologs in the selected fractions exceeds that attained by any of the prior methods which are feasible.

When a mixture of isomeric phenols is distributed—or to use the technical expression, partitioned—between a pair of immiscible solvents, such as benzene or cyclohexane and an aqueous alkaline buffer solution, each isomer thereof has a partition coefficient which differs from the other isomer or isomers. The same holds true for homologous phenols. Then, too, when a mixture of isomeric or homologous phenols having different partition coefficients in reference to the solvent pair is to be separated, each distributes itself independently of the other in the solvent pair. To express this observation in another way, the presence of one isomer does not alter the ratio of the concentration of the other isomers in the solvent pair.

The employment of an alkaline buffer instead of an acidic buffer or even a neutral buffer has several advantages. Since the partition coefficient of a phenol changes with the pH value, a pH can be selected which is most favorable for the countercurrent technique. This is a decided advantage when dealing with slightly soluble phenols. A partition coefficient of unity is generally accepted as the most convenient for such an operation. By changing the pH of the buffer phase to values on the alkaline side, a partition coefficient of a phenol can be varied so as to equal or approach unity. An additional advantage in adjusting the pH of the buffer phase to the values on the alkaline side results from the fact that the ratio of partition coefficient of two phenols may in practice vary with pH, and thus by suitable selection of pH values, the spread between partition coefficients can be generally increased. This means that the degree of separation achievable with isomeric and homologous phenols can be facilitated. Thus the ratio of partition coefficients of 2,4-xylenol and 2,5-xylenol with a buffer at 11.08, employing the same organic solvent phase to make the comparison, is almost three times that with a buffer at 6.65. It will of course be understood that the organic solvent as well as the buffered aqueous solvent phase should be so chosen as to give the greatest shift of partition coefficient with the shift of the pH.

Suitable organic solvents in separating isomeric and homologous phenols are benzene, cyclohexane, hexane, isooctane, isopropyl ether and butyl alcohol. The choice of alkaline buffer will depend upon the pH which is selected. A list of alkaline buffers, by no means exhaustive, is trisodium phosphate+disodium phosphate, sodium pyro-phosphate+disodium phosphate, borax +boric acid, glycine+sodium hydroxide, borax +sodium hydroxide, disodium phosphate+sodium hydroxide, and boric acid+sodium hydroxide+potassium chloride. It will be understood that the partition coefficient will not usually be the same for any two systems in reference to any of the closely related phenols whereby the same solvent pair is the best for every group of isomeric or homologous phenols, but that some determinative tests are necessary in making the selection.

By the term "partition coefficient" is meant the ratio of the concentration of the solute (phenols) in each of the solvent pairs. The term "phase" denotes solvent plus the solute. The term "system" means the lighter (upper) solvent and the heavier (lower) solvent; it is identical in meaning with the designation "solvent pair."

Our process is based upon our findings that when each of the isomeric phenols, for example meta- and para-cresol or meta- and para-ethyl phenol or 2,4-, 2,5-, and 3,5- xylenol, is distributed (partitioned) between an aptly chosen pair of immiscible solvents of the type—organic solvent-aqueous alkaline buffer solution—such as benzene-phosphate buffer or cyclohexane-phosphate buffer, each phenol has a partition coefficient which differs significantly from its isomer or isomers.

The separation of isomeric or homologous phenols by counter-current distribution may be carried out by using separatory funnels or by a commercial stainless steel shaker device. With the former the heavier layer is transferred whereas using the latter the lighter layer is transferred. The steel shaker device permits the convenient application of 50–300 transfers or plates. The latter is referred to more in detail in the examples. In it, for theoretical discussion, the tubes which are 12 mm. in diameter and 16.5 cm. in length may be considered a series of separatory funnels.

The scheme of counter-current distribution is illustrated diagrammatically in Figure 1 of the drawing which illustrates a 6 transfer (plate) operation. Equal volumes of the two immiscible solvents which have been previously saturated with each other, are placed in a separatory funnel or tube of the stainless steel shaker indicated by the circle number 0 in Figure 1, and the compound or mixture to be distributed is added. After shaking, the lower liquid phase is drawn off into tube 1. The upper layer is retained in tube 0. Fresh denser solvent (indicated by P but identified by the legend on that drawing sheet) is added to tube 0 and fresh lighter solvent (indicated by S) is added to tube 1 as indicated. At this stage one complete transfer (plate) has been applied. This is indicated at the left on the drawing under Plate No. by 0. Tubes 0 and 1 are shaken and the layers or phases separated as illustrated. The lower layer from tube 1 is drawn off into tube 2. Fresh denser solvent (P) is then added to tube 0, fresh lighter solvent (S) is added to tube 2 and the lower layer which had been separated from tube 0 is admixed with the upper layer which was retained in tube 1. Two equilibrium transfers or plates have now been completed as indicated by numeral 1 under Plate No. Tubes 0, 1 and 2 are shaken and the layers or phases separated as illustrated. The lower layer from tube 2 is drawn off into tube 3. Fresh dense solvent (P) is added to tube 0. The lower layer, which had been separated off from tube 0, is admixed with the upper layer which was retained in tube 1. The lower layer, which had been separated from tube 1, is admixed with the upper layer retained in tube 2. Fresh light solvent (S) is added to tube 3. Three complete transfers have now been completed. The process can be continued for any given number of plates or transfers.

The fraction of an individual compound carried from one plate to the succeeding plate (transfer) is given by the equation $K/K+1$ where K is the partition coefficient. If the process is stopped after a large number of transfers have been applied, the original sample is distributed among the various tubes of the shaker apparatus (type as referred to in the examples below) according to a Gaussian distribution. This means a plot of the specific tube numbers vs. the amount of the sample in each corresponding tube gives a distribution curve. Where the partition coefficient has a value of one, the peak of this curve is at the center tube. If the coefficient is greater or less than one, the peak concentration will be to the right or left respectively of the center tube. The exact position, N, of the peak is given by the expression $$N = n\left(\frac{K}{K+1}\right)$$

where $n$ is the total number of tubes.

In Figure 1 the last horizontal line shows the distribution of one gram of a substance having a partition coefficient of one at the end of a 6-plate (transfer) distribution.

There has been explained supra that when a mixture of compounds having different partition coefficients is to be resolved, each compound distributes itself independently of the others. So for each compound after a large number of transfers have been applied there will be a characteristic distribution. When the various individual tube numbers are plotted on the abscissa axis vs. the amount of the same compound present in each corresponding tube on the ordinate axis a distribution curve is obtained when the points are joined. A series of distribution curves is obtained when each of the isomers or homologues of the phenols is thus plotted. It is necessary to measure the amount of the original isomer or homologue in each tube. This can be done by any suitable technique, such as ultraviolet or infrared measurements or by direct weighing of the residue in each tube after removal of solvents. In cases where there is overlapping of the distribution curves, the concentration of each isomer or homologue in each tube can be determined by mathematical analysis of the distribution curves.

We shall now further explain our invention by giving a number of specific examples, but we wish it to be understood that our invention is in no way limited to these examples.

EXAMPLE 1

A mixture of 100 mg. each of meta-cresol and para-cresol was subjected to a 53 transfer counter-current distribution. The equipment utilized for this was a commercial stainless steel shaker with the plurality of tubes required. The individual tubes may be considered as a series of separatory funnels. They are 12 mm. in diameter and 16.5 cm. long, formed as holes in the upper and lower halves or section of the metal block. This type of apparatus and its operation is described on pages 520–523 of an article by L. C. Craig in vol. 155 (1944), J. Biol. Chem.

The immiscible solvent pair selected was benzene and an aqueous phosphate buffer of pH 11.08. The latter contained a mixture of 42.6 grams of disodium phosphate and 34.4 trisodium phosphate per liter. The distribution was carried out as follows at 25° C.

The benzene and this buffer were shaken, let stratify and then separated to secure a mutually saturated solvent pair. The lower portions of tubes 0 to 54 of the apparatus were filled with the buffer. An equal volume of this benzene was added to tubes 1 to 54. Into tube 0 a 10 ml. benzene solution, containing 100 mg. each of m-cresol and p-cresol, was added. The apparatus was tilted back and forth thirty times to obtain intimate mixing of the phases. The apparatus was then allowed to remain in a vertical position until phase separation took place. The upper drum was rotated in a clockwise direction over the lower drum until upper tube 0 was over the next adjacent lower tube. Shaking and stratification of layers was carried out as before. This series of operations was continued until one revolution of the upper drum was completed. The material in each tube was then removed and introduced into individual glass tubes. One cc. of 6 N hydrochloric acid was added to each tube to liberate the cresols present in the buffer phase. Each tube was then shaken to extract the liberated cresols into the benzene layer. The benzene layers were then analyzed by measuring the optical density of each benzene layer at wave lengths of 280 m$\mu$ and 286 m$\mu$. The amount of each isomer in each tube was then calculated by straight forward solution of the following simultaneous equations:

$$E_{\lambda 286} = 2.66x + 15.82y$$
$$E_{\lambda 280} = 14.36x + 17.90y$$

where E is the optical density and $x$ and $y$ are the concentrations in grams per liter of meta- and para-cresol, respectively.

The resolution of these two isomeric phenols obtainable in fifty-three transfers is shown by the distribution curves of Figure 2. The concentration of each isomer in representative tubes is given in Table 1.

Table 1

SEPARATION OF A CRESOL MIXTURE BY COUNTER-CURRENT DISTRIBUTION

| Tube No. | Weight, percent— | |
|---|---|---|
| | m-cresol | p-cresol |
| 16 | 96.7 | 3.3 |
| 18 | 97.3 | 2.7 |
| 20 | 93.6 | 6.4 |
| 22 | 81.8 | 18.2 |
| 24 | 75.8 | 24.2 |
| 26 | 65.0 | 35.0 |
| 28 | 51.1 | 48.9 |
| 30 | 38.3 | 61.7 |
| 32 | 24.6 | 75.4 |
| 34 | 18.3 | 81.7 |
| 36 | 14.0 | 86.0 |
| 38 | 11.0 | 89.0 |
| 40 | 6.5 | 93.5 |

EXAMPLE 2

A mixture of 10 mg. each of 2,4-, 2,5-, and 3,5-xylenol was subjected to a 53 transfer counter-current distribution, wherein the solvent system was cyclohexane-aqueous phosphate buffer of pH 11.08 and the temperature during the operation was 25° C. The buffer was the same as designated in Example 1.

The procedure was identical with that set out in the previous example, so a detailed description will not be repeated.

The resolution of these three isomeric phenols is shown by the distribution curves of Figures 3; the quantity of each isomer in each tube of the distribution instrument is shown as a point, the entire series of which points form the plot of Figure 3. The concentration of each isomer in representative tubes is set out in Table 2.

Table 2

SEPARATION OF A XYLENOL MIXTURE BY COUNTER-CURRENT DISTRIBUTION

| Tube No. | Weight, percent— | | |
|---|---|---|---|
| | 3,5-xylenol | 2,5-cylenol | 2,4-xylenol |
| 8 | 100 | 0 | 0 |
| 12 | 97.0 | 3.0 | 0 |
| 16 | 88.7 | 8.1 | 3.2 |
| 20 | 14.0 | 79.0 | 7.0 |
| 24 | 1.7 | 79.9 | 18.4 |
| 28 | 0 | 50.6 | 49.4 |
| 32 | 0 | 17.8 | 82.2 |
| 36 | 0 | 0 | 100 |

EXAMPLE 3

A mixture of 10 mg. each of o-ethyl phenol, m-ethyl phenol, and p-ethyl phenol was subjected to a 53 transfer counter-current distribution in the same manner and under like conditions as has been described in Example 1 supra. The system used was cyclohexane and aqueous phosphate buffer at a pH of 11.08. The buffer was likewise the same as that previously designated.

The resolution of these three isomeric ethyl phenols—ortho, meta, and para—obtained, is shown by the representative distribution given in Figure 4; the analysis of the content of each tube is indicated graphically. The concentration of each isomer in representative tubes is presented in Table 3.

Table 3

SEPARATION OF AN ETHYLPHENOL MIXTURE BY COUNTER-CURRENT MIXTURE

| Tube No. | Weight, percent— | | |
|---|---|---|---|
| | m-ethylphenol | p-ethylphenol | o-ethylphenol |
| 8 | 77.8 | 22.2 | 0 |
| 12 | 57.8 | 42.2 | 0 |
| 16 | 39.3 | 60.7 | 0 |
| 20 | 18.6 | 81.4 | 0 |
| 24 | 0 | 12.3 | 87.8 |
| 28 | 0 | 3.1 | 96.9 |
| 32 | 0 | 5.7 | 94.3 |
| 36 | 0 | 0 | 100.0 |

From the above three examples it is plainly evident that it is entirely feasible to resolve isomeric phenols by the counter-current distribution in which there is a multiplicity of transfers and wherein the system is an organic solvent and an aqueous alkaline buffer. When homologous phenols such as phenol and the cresols, ethyl phenol, and propyl phenol, and a naphthol and methyl α naphthol are subjected to this process a highly efficient separation into individual compounds is also attainable. This process is also adaptable for separating hydroxyhydrindene from methyl-hydroxyhydrindene. In commercial operations wherein the quantities of solute mixtures are large, it is quite apparent that the apparatus employed in the examples herein would not be selected.

The process herein can be carried out in a continuous manner. In fact, in industrial separation of individual phenols from a mixture of either isomeric or homologous phenols or from other closely related phenols by the method of our invention, the process would usually or very probably be carried out in a continuous manner. An apparatus in which our method could be carried out in a continuous manner is both diagrammatically illustrated and described in an article by Edw. G. Scheibel on pages 681,684 of Chemical Engineering Progress, vol. 44, No. 9, September 1948. That apparatus has multi-stage extraction zones of alternate calming and mixing zone with a centrally located shaft upon which are mounted agitators with vertical blades. The solute is introduced into the middle of the height of the extraction column. The heavier solvent is introduced at the top and flows downwardly, whereas the lighter solvent is introduced at the bottom and flows upwardly.

While we have shown only several embodiments of our invention, it is to be understood that this is by way of example only and various changes and modifications may be made without departing from the spirit of our invention.

We claim:

1. In the process of separating mixtures of phenols into individual phenols by counter-current distribution, involving the steps of agitating and intimately contacting a mixture of structurally closely related phenols with liquids which are immiscible under the conditions of separation and possess different densities, one of said liquids being an organic liquid possessing solvent properties for each of the phenols and the other of the liquids being a buffered aqueous solution possessing different solvent properties for these phenols, the partition coefficient in these two solvents being different for each phenol in the mixture, permitting stratification after this intimate mixing, separating the upper extract phase from the lower extract phase, and successively extracting said upper extract phase with fresh quantities of that solvent which is denser with respect to said upper extract phase and successively extracting said lower extract phase with fresh quantities of that solvent which is lighter with respect to said lower extract phase, while employing the denser phase extracts resulting from said successive extractions of said upper extract phase to successively extract the lighter phase extracts resulting from said successive extractions of said lower extract phase, the improvement which consists in employing a buffered aqueous solution which has a pH value in the order of 11, whereby the partition coefficients of the individual phenols, and the ratios of the partition coefficients of the individual phenols, are shifted to values most favorable to the separation of the mixture of phenols into its individual components.

2. In the process of separating mixtures of isomeric phenols into individual phenols by counter-current distribution, involving the steps of agitating and intimately contacting a mixture of isomeric phenols with liquids which are immiscible under the conditions of separation and possess different densities, one of said liquids being an organic liquid possessing solvent properties for each of the phenols and the other of the liquids being a buffered aqueous solution possessing different solvent properties for these phenols, the partition coefficient in these two solvents being different for each phenol in the mixture, permitting stratification after this intimate mixing, then separating the upper extract phase from the lower extract phase, and successively extracting said upper extract phase with fresh quantities of that solvent which is denser with respect to said upper extract phase and successively extracting said lower extract phase with fresh quantities of that solvent which is lighter with respect to said lower extract phase, while employing the denser phase extracts resulting from said successive extractions of said upper extract phase to successively extract the lighter phase extracts resulting from said successive extractions of said lower extract phase, the improvement which consists in employing a buffered aqueous solution which has a pH value in the order of 11, whereby the partition coefficients of the individual phenols, and the ratios of the partition coefficients of the individual phenols, are shifted to values most favorable to the separation of the mixture of phenols into its individual components.

3. In the process of separating mixtures of homologous phenols into individual phenols by counter-current distribution, involving the steps of agitating and intimately contacting a mixture of homologous phenols with liquids which are immiscible under the conditions of separation and possess different densities, one of said liquids being an organic liquid possessing solvent properties for each of the phenols and the other of the liquids being a buffered aqueous solution possessing different solvent properties for these phenols, the partition coefficient in these two solvents being different for each phenol in the mixture, permitting stratification after this intimate mixing, separating the upper extract phase from the lower extract phase, and successively extracting said upper extract phase with fresh quantities of that solvent which is denser with respect to said upper extract phase and successively extracting said lower extract phase with fresh quantities of that solvent which is lighter with respect to said lower extract phase, while employing the denser phase extracts resulting from said successive extractions of said upper extract phase to successively extract the lighter phase extracts resulting from said successive extractions of said lower extract phase, the improvement which consists in employing a buffered aqueous solution which has a pH value in the order of 11, whereby the partition coefficients of the individual phenols, and the ratios of the partition coefficients of the individual phenols, are shifted to values most favorable to the separation of the mixture of phenols into its individual components.

4. In the process of separating meta-cresol from para-cresol by counter-current distribution, involving the steps of agitating and intimately contacting a mixture of meta- and para-cresols with liquids which are immiscible under the conditions of separation and possess different densities, one of said liquids being an organic liquid possessing solvent properties for each of the phenols and the other of the liquids being a buffered aqueous solution possessing different solvent properties for these phenols, the partition coefficient in these two solvents being different for each phenol in the mixture, permitting stratification after this intimate mixing, then separating the upper extract phase from the lower extract phase, and successively extracting said upper extract phase with fresh quantities of that solvent which is denser with respect to said upper extract phase and successively extracting said lower extract phase with fresh quantities of that solvent which is lighter with respect to said lower extract phase, while employing the denser phase extracts resulting from said successive extractions of said upper extract phase to successively extract the lighter phase extracts resulting from said successive extractions of said lower extract phase, the improvement which consists in employing a buffered aqueous solution which has a pH value in the order of 11, whereby the partition coefficients of the individual phenols, and the ratios of the partition coefficients of the individual phenols, are shifted to values most favorable to the separation of the mixture of phenols into its individual components.

5. In the process of separating the isomers of xylenol from one another by a method involving the steps of agitating and intimately contacting a mixture of isomeric xylenols with liquids which are immiscible under the conditions of separation and possess different densities, one of said liquids being an organic liquid possessing solvent properties for each of the phenols and the other of the liquids being a buffered aqueous solution possessing different solvent properties for these phenols, the partition coefficient in these two solvents being different for each phenol in the mixture, permitting stratification after this intimate mixing, separating the upper extract phase from the lower extract phase, and successively extracting said upper extract phase with fresh quantities of that solvent which is denser with respect to said upper extract phase and successively extracting said lower extract phase with fresh quantities of that solvent which is lighter with respect to said lower extract phase, while employing the denser phase extracts resulting from said successive extractions of said upper extract phase to successively extract the lighter phase extracts resulting from said successive extractions of said lower extract phase, the improvements which consists in employing a buffered aqueous solution which has a pH value in the order of 11, whereby the partition coefficients of the individual phenols, and the ratios of the partition coefficients of the individual phenols, are shifted to values most favorable to the separation of the mixture of phenols into its individual components.

6. In the process of separating isomers of ethyl-phenols from one another by a method involving the steps of agitating and intimately contacting a mixture of isomeric ethyl phenols with liquids which are immiscible under the conditions of separation and possess different densities, one of said liquids being an organic liquid possessing solvent properties for each of the phenols and the other of the liquids being a buffered aqueous solution possessing different solvent properties for these phenols, the partition coefficient in these two solvents being different for each phenol in the mixture, permitting stratification after this intimate mixing, then separating the upper extract phase from the lower extract phase and successively extracting said upper extract phase with fresh quantities of that solvent which is denser with respect to said upper extract phase and successively extracting said lower extract phase with fresh quantities of that solvent which is lighter with respect to said lower extract phase, while employing the denser phase extracts resulting from said successive extractions of said upper extract phase to successively extract the lighter phase extracts resulting from said successive extractions of said lower extract phase, the improvement which consists in employing a buffered aqueous solution which has a pH valve in the order of 11, whereby the partition coefficients of the individual phenols, and the ratios of the partition coefficients of the individual phenols, are shifted to values most favorable to the separation of the mixture of phenols into its individual components.

7. The process of separating meta-cresol from para-cresol by the countercurrent distribution method comprising the steps of agitating and intimately contacting a mixture of meta- and para-cresols with a mixture of benzene and an aqueous alkaline buffer solution of substantially pH 11, permitting stratification after this intimate mixing, separating the benzene extract phase from the heavier aqueous alkaline extract phase, and successively extracting said benzene extract phase with quantities of fresh aqueous alkaline buffer solution, and successively extracting said aqueous alkaline extract phase with quantities of fresh benzene, while employing the aqueous alkaline extracts resulting from said successive extractions of said benzene extract phase to successively extract the benzene extracts resulting from said successive extractions of said aqueous alkaline extract phase.

8. The process of separating xylenols from one another by the countercurrent distribution method comprising the steps of agitating and intimately contacting a mixture of 2,4-, 2,5-, and 3,5-xylenols with cyclohexane and an aqueous alkaline buffer solution of substantially pH 11, permitting stratification after this intimate mixing, separating the cyclohexane extract phase from the heavier aqueous alkaline extract phase, and successively extracting said cyclohexane extract phase with quantities of fresh aqueous alkaline buffer solution, and successively extracting said aqueous alkaline extract phase with quantities of fresh cyclohexane, while employing the aqueous alkaline extracts resulting from said successive extractions of said cyclohexane extract phase to successively extract the cyclohexane extracts resulting from said successive extractions of said aqueous alkaline extract phase.

9. The process of separating isomers of ethyl phenols from one another by the countercurrent distribution method comprising the steps of agitating and intimately contacting a mixture of o-ethyl phenol, m-ethyl phenol, and p-ethyl phenol with cyclohexane and an aqueous alkaline buffer solution of substantially pH 11, permitting stratification after this intimate mixing, separating the cyclohexane extract phase from the heavier aqueous alkaline extract phase, and successively extracting said cyclohexane extract phase with quantities of fresh aqueous alkaline buffer solution, and successively extracting said aqueous alkaline extract phase with quantities of fresh cyclohexane, while employing the aqueous alkaline extracts resulting from said successive extractions of said cyclohexane extract phase to successively extract the cyclohexane extracts resulting from said successive extractions of said aqueous alkaline extract phase.

CALVIN GOLUMBIC.
MILTON ORCHIN.

REFERENCES CITED

The following references are of record in the file of this patent:

UNITED STATES PATENTS

| Number | Name | Date |
|---|---|---|
| 2,459,540 | Rosenwald | Jan. 18, 1949 |

OTHER REFERENCES

Warshowsky et al.: Anal. Chem., vol. 20, 951-4 (1948).